United States Patent [19]

Evans et al.

[11] Patent Number: 4,728,881
[45] Date of Patent: Mar. 1, 1988

[54] CIRCUIT FOR PROVIDING A CONTROLLED RESISTANCE

[75] Inventors: William A. Evans; Stuart L. Rowlands, both of Swansea, United Kingdom

[73] Assignee: Haven Automation Limited, Swansea, United Kingdom

[21] Appl. No.: 16,286

[22] Filed: Feb. 19, 1987

[30] Foreign Application Priority Data

Feb. 19, 1986 [GB] United Kingdom ............. 8604125

[51] Int. Cl.[4] ............................................ G01R 27/02
[52] U.S. Cl. ...................................... 323/353; 324/62; 374/1
[58] Field of Search ............... 323/352, 353; 324/62, 324/63, 65 R; 374/1

[56] References Cited

U.S. PATENT DOCUMENTS 4,406,766  9/1983  MacDonald ..................... 324/438

Primary Examiner—Patrick R. Salce
Assistant Examiner—Judson H. Jones
Attorney, Agent, or Firm—Malcolm B. Wittenberg

[57] ABSTRACT

A circuit for providing a controlled resistance, the circuit comprising a pair of terminals for input of an excitation current, variable resistance means connected in the current path between the terminals, means for deriving a first signal representing the value of the voltage appearing across the terminals, means for deriving a second signal representing the value of the excitation current, means for generating a third signal representing a selected value of resistance to be provided between the pair of terminals, means for comparing the ratio of the first and second signals with the value of the third signal to derive a difference signal, and means for applying the difference signal to cause the variable resistance means to change in value such that said ratio tends towards exact equality with the selected value of resistance.

20 Claims, 3 Drawing Figures

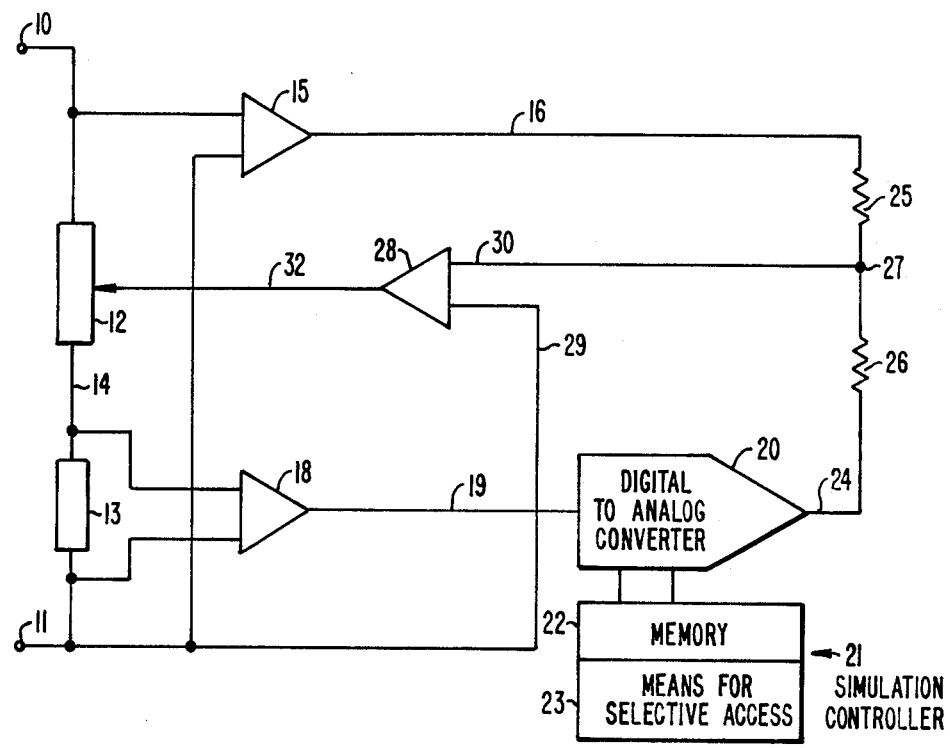
FIG._1.
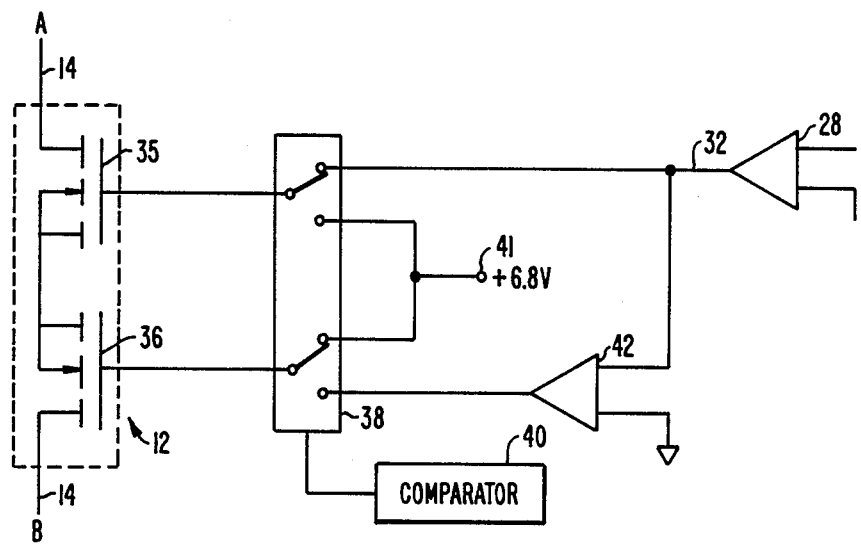
FIG._2.

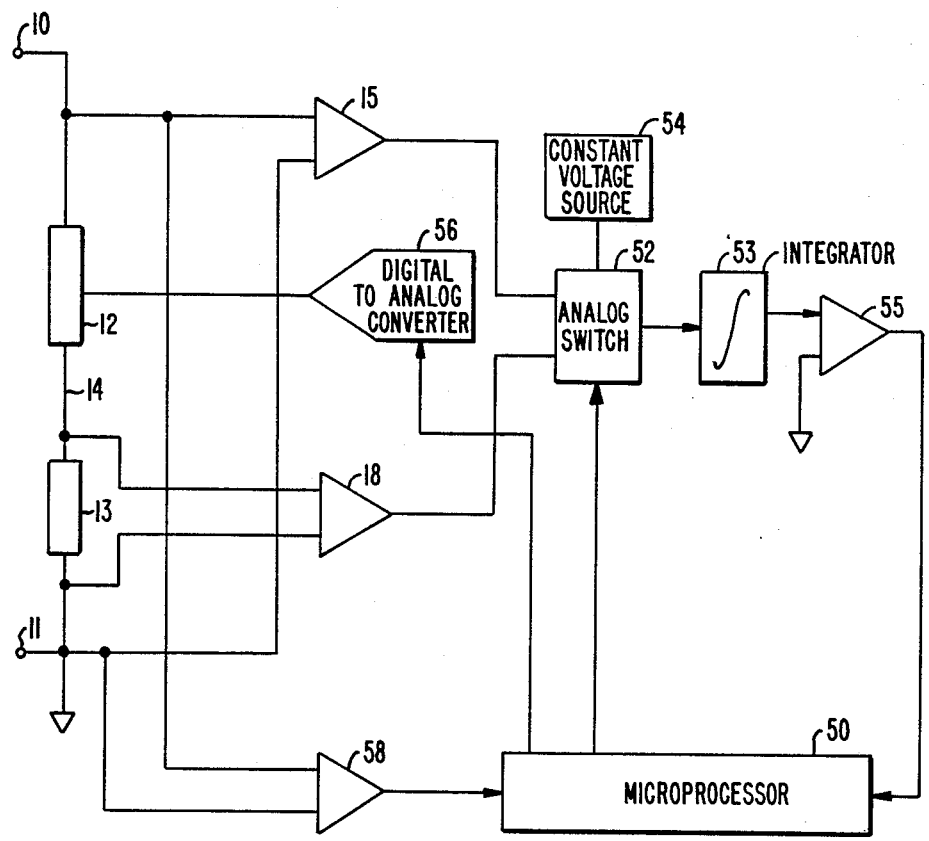
FIG._3.

CIRCUIT FOR PROVIDING A CONTROLLED RESISTANCE

BACKGROUND OF THE INVENTION

The invention relates to a circuit for providing a controlled resistance. In particular, the circuit is adapted to simulate the characteristic of a resistance-variable sensing element, particularly a platinum temperature detecting element.

It is known to employ an electrical circuit to provide a controlled resistance, e.g. by use of a resistance bridge. However, such known circuits suffer from the disadvantage that it is difficult to provide an accurately controlled resistance which is stable over a long period of time and over a range of ambient temperatures. Furthermore, the known circuits require adjustment in order to provide a desired controlled resistance and cannot automatically produce any selected value of resistance.

The use of temperature detectors which depend on the measurement of variation of the resistance of an element with temperature is also well known. For accurate measurement in the range −200 to +600 deg C., the element is most commonly a grade of pure platinum which is referred to as Pt100. Elements of Pt100 are manufactured and used in accordance with national standards such as British Standard (BS) 1904:1984. The standards define the resistance of the element over the temperature range and the tolerances permitted at fixed temperature points for different classes of measurement. Standardised Pt100 elements are highly stable and are interchangeable but the resistance-temperature characteristic is only approximately linear, with a slope of about 0.4 ohm/deg C, and variation in slope prevents extrapolation over any extended range. Calibration of a measuring instrument therefore requires comparison at a large number of points on the temperature scale.

For each point on the scale it is usual to connect to the instrument a resistance of exactly known value which corresponds to that of a Pt100 element at the same temperature. This process is known as simulation since it replaces the use of an actual element immersed in a succession of constant temperature baths or enclosures. The problem of calibration is enhanced because Pt100 thermometry is not only a laboratory technique but is used in the routine supervision of industrial processes. This has been made possible by the availability of compact microelectronic measuring instruments at low cost. The long-term stability of such instruments may be uncertain and some convenient means of recalibration in the field is very desirable.

Calibration requires an excitation current to be passed through the simulator resistance and the instrument is most commonly some form of bridge. Alternatively the instrument may provide a source of constant current and means for measuring the voltage drop on the resistance. The simulator resistance itself is available in the form of a resistance box in which a number of tappings directly identify the corresponding temperatures. For intermediate points the user must resort to a conventional switched decade resistance box, which essentially restricts the procedure to laboratory conditions. An approach to continuity of calibration over the temperature range has been made by the use of a high-resolution multi-turn potentiometer but extreme care is required in manual setting.

SUMMARY OF THE INVENTION

The present invention aims to provide a circuit for providing a controlled resistance which can automatically produce any selected value of resistance. Furthermore, the present invention aims to provide such a circuit which produces a selected value of resistance which is more accurate than the known circuits discussed hereinabove.

The present invention also aims to provide a resistance simulation circuit, suitable for use in the field, in which, on connection into an instrument test circuit, any selected value of resistance may be produced automatically. It is intended that the resistance value should be defined with an accuracy greater than that specified for BS1904:1984 Class 1.

The present invention provides a circuit for providing a controlled resistance, the circuit comprising a pair of terminals for input of an excitation current, variable resistance means connected in the current path between the terminals, means for deriving a first signal representing the value of the voltage appearing across the terminals, means for deriving a second signal representing the value of the excitation current, means for generating a third signal representing a selected value of resistance to be provided between the pair of terminals, means for comparing the ratio of the first and second signals with the value of the third signal to derive a difference signal, and means for applying the difference signal to cause the variable resistance means to change in value such that said ratio tends towards exact equality with the selected value of resistance.

Preferably, the means for generating the third signal includes means for storing values of resistance, means for selecting a desired one of such values and means for deriving a read-out signal representing the resistance value.

More preferably, the means for selecting a desired resistance value includes programming means enabling the selection of a succession of predetermined values.

Desirably, the read-out signal has a value equal to the selected resistance expressed as a fraction of the maximum resistance which is provided between the pair of terminals and the third signal is obtained by multiplying the read-out signal by a further signal representing the maximum resistance value.

In one preferred embodiment the circuit is adapted to be inputted with a d.c. excitation of predetermined polarity and the variable resistance means comprises a field-effect transistor.

In this embodiment, the means for comparing may comprise means for deriving a product signal equal to the product of the second and third signals, means for opposing the first signal and the product signal at a common point and means for detecting a departure from zero potential at that point.

More preferably, the means for detecting a departure from zero potential comprises a nulling operational amplifier having input connections at the common point potential and at zero reference potential such that the difference signal is produced at the output of the amplifier.

In another preferred embodiment the circuit is adapted to be inputted with a d.c. excitation of undetermined polarity or an a.c. excitation, and the variable resistance means comprises a pair of field-effect transistors, series connected in opposition, that one of the pair which is forward conducting being operative in the variable resistance mode and the other of the pair being subject to saturation bias.

In this embodiment, the means for comparing may comprise means for rectifying and integrating the first and second signals, means for deriving from the respective integrals a value representing the voltage level and a value representing the current level, storage means for the selected resistance value and means for computing the ratio of voltage and current for comparison with the resistance value to produce the difference signal.

The circuit may be adapted to simulate the characteristic of a resistance-variable sensing element, and the third signal represents a selected value of resistance at a selected point on the characteristic to be simulated.

BRIEF DESCRIPTION OF THE DRAWINGS

Embodiments of the present invention will now be described by way of example only with reference to the accompanying drawings in which:

FIG. 1 represents schematically a circuit for a simulator in accordance with the invention and suitable for use with d.c. excitation;

FIG. 2 shows the arrangement of the variable resistance in the circuit of FIG. 1; and FIG. 3 represents schematically a modified form of the circuit of FIG. 1 for use with either d.c. or a.c. excitation.

DESCRIPTION OF THE PREFERRED EMBODIMENTS

The present invention will be described with reference to a circuit for simulating the resistance characteristic of a Pt100 temperature detector. However, it will be apparent to those skilled in the art that the disclosed circuits can be used for providing any controlled resistance within a desired range.

The principles of construction and operation of a circuit for simulating a Pt100 temperature sensor will be described with reference to FIG. 1. A pair of terminals 10, 11 is provided for connection to the instrument to be calibrated. A variable resistance device 12 and a high-stability resistor 13 of a value Ri are connected in series in a line 14 between terminals 10, 11 to provide a path for the passage of a d.c. excitation current I supplied by the test instrument. Terminal 11 is at a reference potential which, in the present discussion, is taken to be zero volts.

The voltage drop, of a value V, between terminals 10, 11 is sensed by an amplifier 15 of unit gain. A buffered output signal of positive polarity, which is of value V and directly represents the terminal voltage drop, is produced on a line 16 and will be referred to as the voltage-related signal. The voltage drop across resistor 13 is used to monitor the excitation current. The voltage drop is equal to the product Ri.I and is sensed by an amplifier 18, of gain G, which produces an output G.Ri.I on a line 19. It is convenient at this stage to identify within the output a current-related signal of value I which directly represents the level of excitation and to consider the factor G.Ri separately. The value of resistor 13 is chosen so that the product G.Ri is numerically equal to the maximum value of Pt100 resistance which it is intended to simulate. In the present case, for Ri=10 ohms and G=40, that resistance is 400 ohms which corresponds to a maximum nominal Pt100 temperature of 850 deg C.

The signal G.Ri.I on line 19 is applied to the reference input of a multiplying digital-to-analogue converter 20 which also receives a 16-bit digital input from a simulation controller 21. Essentially the controller comprises a memory 22 and means for selective access 23. The memory contains the characteristic of a Pt100 element in the form of tabulated values of resistance and temperature and may be accessed by specifying a value of either parameter. The output is in terms of the specified, or equivalent, resistance calculated as a fraction of the maximum simulated resistance. Thus, if the resistance to be simulated is specified as Rsim, and since the maximum has been set at 400 ohms, a 16-bit number X is generated such that the required fraction is in the form $X/(2^{16}-1)$ and is equal to Rsim/400. Multiplication by converter 20 yields an output on a line 24 which is of negative polarity and is equal to (G·Ri/400)Rsim·I or k·Rsim·I. This voltage will be referred to as the product signal, denoting the product of the current-related signal and a new resistance-related signal which directly represents the selected resistance value. The lines 16 and 24 are bridged through a pair of resistors 25 and 26, which are connected in series with common point 27. Resistors 25, 26 are of equal values Ra, Rb respectively. Since the voltage-related signal on line 16 is opposed to the product signal on line 24, a condition must arise in the excitation circuit which will cause the potential at the common point 27 to become zero. When this condition occurs:

$$V/Ra = k \cdot Rsim \cdot I/Rb \text{ or } V/I = k \cdot Rsim \cdot Ra/Rb \tag{1}$$

For Ra=Rb and k=1 we now have the required condition that the resistance V/I seen by the test instrument is equal to the programmed value Rsim. Any possible error in the values of Ri and G, such that k is not exactly equal to one, is compensated by trimming one of the resistors Ra, Rb, so that k·Ra/Rb=1. The desired relationship V/I=Rsim is then realised exactly.

The adjustment of circuit conditions in line 14 to satisfy equation (1) is brought about by variation in resistive device 12 under the control of a high-gain amplifier 28. One input to amplifier 28 is referred via a line 29 to terminal 11, at reference potential and the non-inverting input 30 to point 27. Until equation (1) is balanced, point 27 may be positive or negative. A difference signal which is related to the departure from zero at point 27 is therefore generated at the output of amplifier 28 on a line 32.

Device 12 is in general terms a voltage-controlled resistor which is arranged to respond to the signal on line 32. As the resistance changes, the effect is fed back by the voltage and/or current-related signal to point 27 and modifies the difference signal. For example, if I is constant and V is too low, point 27 will be negative and the difference signal will cause device 12 to increase in resistance until point 27 is driven to zero. If the current supply is not stabilised, a smaller increase in the resistance of device 12 will suffice since V will increase and I will decrease simultaneously. It is an advantage of the arrangement that the precise characteristic of device 12 need not be known. Provided the required range of resistance is available, feedback will continue until a balance is established at point 27.

The voltage-controlled resistive device 12 has been made in the form of a photo-resistive element controlled by a solid-state lamp but the high current consumption presents a problem in battery-operated portable equipment. It is also difficult to achieve the low values of resistance which correspond to the lowest temperatures. In a preferred form, indicated in FIG. 2, resistor 12 comprises a pair of VMOS field-effect transistos 35, 36 which are connected in series, source to source. Dependent on the polarity of the excitation current, as is explained below, only one device of the pair is active. The connections into line 14 are made at the drain terminals and the resistance of the active device is varied in dependence on the gate-source voltage which is determined by the output from amplifier 28. A VMOS field-effect transistor is symmetrical in construction and in conduction characteristics and may pass current in either direction. However, in the case of an N-channel enhancement mode device, such as the commerical type VN66AF, a limit is imposed on the drain-source reverse voltage which could be exceeded in the present application. In order to permit the excitation current to flow in either direction, the problem is overcome by the use of two devices 35, 36. One is operated as a linearly variable resistor while the other is saturated. The respective roles of devices 35, 36 are determined by a multiplexer 38 which is switched in accordance with the direction of current flow in line 14 as detected by a comparator 40. If current in line 14 flows from A to B, device 35 will operate in the linear mode, receiving its gate signal direct from amplifier 28. At the same time, device 36 will receive a gate signal of +6.8 volts from a supply point 41 which forces the drain-source resistance to a low value. If current in line 14 flows from B to A, device 35 will receive the saturating input while device 36 receives its gate signal from amplifier 28. The latter connection must now be made via an inverting amplifier 42 to ensure that negative feedback continues to operate around the control loop of amplifier 28.

Other components which have been mentioned in the discussion of the circuit of FIG. 1, and the design considerations associated with them, will be familiar to those engaged in the art. It is important that the operational amplifiers are selected with regard to the avoidance of voltage offset errors and to stability of gain. It is preferred to use chopper stabilisation in all cases.

The level of excitation current may be of any value in the mA range up to 15 mA. It has been found preferable to avoid operation with very low currents and it is advisable to include a detector (not shown) which will inhibit operation if the excitation should fall below 250 microamp.

With regard to the selection of the value of Rsim, it will be apparent that simulation controller 21 can be arranged to provide any desired programming feature or to receive commands or data from an external computer. It is visualised that the input of an instruction to set a value of Rsim may specify either a resistance or a temperature, on any scale, which will automatically be converted to an equivalent value of resistance. It is also proposed to provide a sweep facility for an automatic stepped variation through a range of resistance or temperature.

The accuracy of simulation is partly determined by circuit factors such as the operation of the nulling amplifier 28 and the accuracy and stability of the quantity G.Ri (as modified by the trimming of resistor 25 or 26). The value as selected by simulation controller 21 presents no difficulty. Ideally, a 16-bit input to convertor 20 permits a resolution of one part in 65535. Even in the presence of noise no very serious degradation is expected. Overall, it is believed to be possible to simulate the temperature range defined by BS1904 with a resolution of about 12 milliohms, which corresponds to about 0.03 deg C. at 0 deg C. The absolute error in such measurement is expected to be less than half that allowed by BS1904 for Class 1 grades of element at 0 deg C.

The preceding description relates to direct current excitation. It will be shown with reference to FIG. 3 that the invention can be applied to an apparatus for a.c./d.c. excitation. A.C. exciation is unlikely to be used in the field but is common in laboratory conditions. Operation in the d.c. mode will be considered first. FIG. 3 shows a schematic circuit having some features in common with FIG. 1. As before, current is applied via terminals 10, 11 and flows through resistive device 12 and current-monitoring resistor 13 in line 14. A signal representing the voltage between terminals 10, 11 is developed by amplifier 15 and a current-related signal derived from the voltage drop on resistor 13 is produced by amplifier 18. Subsequent signal processing is controlled by a microprocessor 50. The operation of an analogue switch unit 52 is controlled by microprocessor 50 to switch the voltage- and current-related signals in turn to a dual-ramp integrator 53. Integration proceeds for a set period, which may be 100 ms., corresponding to an integral number of periods of the mains supply so that the effect of mains hum induced in wiring external to the simulator is eliminated.

At the end of the first set period, the voltage-related signal is removed from integrator 53 by switch 52 and is replaced by a reference voltage from a constant source 54. The effect is to return the integrator output to zero during an interval Tv. The zero point is sensed by a comparator 55 and Tv is measured by microprocessor 50 or by separate counting logic (not shown). Tv is proportional to the mean d.c. input voltage and a corresponding measure of current is derived as a value Ti by integration of the current-related signal. The ratio Tv/Ti is thus proportional to the resistance observed between terminals 10, 11 and is determined by microprocessor 50 for comparison with the programmed value of resistance Rsim. A digital difference signal is thereby produced for input to a digital to analogue converter 56. The output from converter 56 is applied to control device 12 so as to adjust the values of V and I in the same way as in the d.c. model. Feedback again operates to stabilise the value of V/I, the comparison of the progressively adjusted value with the programmed value being carried out by the microprocessor. In order to establish the correct polarity of the reference voltage at switch unit 52, the polarity of terminals 10, 11 is checked by a comparator 58, the output of which is passed to the microprocessor.

Operation in the a.c. mode is unchanged in principle and only the input to integrator 53 is adapted to accommodate an a.c. signal. The output of comparator 58 is no longer a binary voltage level but a square wave at the frequency of the excitation current. On selection of the voltage-related signal to integrator 53, the corresponding analogue switch 52 is opened and closed at the frequency indicated by comparator 58. The effect is to provide a half-wave rectified input to integrator 53. The mean d.c. level of this waveform is measured as before in terms of the time taken to return the integrator output to zero. The current signal is measured in the same way and the ratio of the resulting quantities T'v and T'i is again compared with the programmed value of resistance by the microprocessor to control the setting of device 12.

Alternative embodiments of the invention have been described which are particularly directed to the checking and calibration of measuring instruments for use in Pt100 thermometry. The invention is equally applicable in any situation in which the interrogation of passive resistive sensing devices can usefully be simulated. Such cases are expected to include the use of resistive strain gauges and temperature sensing by thermistors.

The circuit for providing a controlled resistance in accordance with the present invention may also be employed in a variety of apparatus in which an accurate resistance is required to control external circuitry. For example, the controlled resistance may be employed in a volume control of an audio amplifier, in an intensity control of a heater in a vehicle, or in a dimmer control of a lighting system. Other suitable applications will be apparent to those skilled in the art. The invention may usefully be employed whenever it is required to provide a succession of accurate resistors over a particular range and where it is required to be able to switch rapidly between resistances in the range.

What we claim is:

1. A circuit for providing a controlled resistance, the circuit comprising a pair of terminals for input of an excitation current, variable resistance means connected in the current path between the terminals, means for deriving a first signal representing the value of the voltage appearing across the terminals, means for deriving a second signal representing the value of the excitation current, means for generating a third signal representing a selected value of resistance to be provided between the pair of terminals, means for comparing the ratio of the first and second signals with the value of the third signal to derive a difference signal, and means for applying the difference signal to cause the variable resistance means to change in value such that said ratio tends towards exact equality with the selected value of resistance.

2. A circuit according to claim 1, wherein the means for generating the third signal includes means for storing values of resistance, means for selecting a desired one of such values and means for deriving a read-out signal representing the resistance value.

3. A circuit according to claim 2, wherein the means for selecting a desired resistance value includes programming means enabling the selection of a succession of predetermined values.

4. A circuit according to claim 2, wherein the read-out signal has a value equal to the selected resistance expressed as a fraction of the maximum resistance which is provided between the pair of terminals and the third signal is obtained by multiplying the read-out signal by a further signal representing the maximum resistance value.

5. A circuit according to claim 1, wherein the circuit is adapted to be inputted with a d.c. excitation of predetermined polarity and the variable resistance means comprises a field-effect transistor.

6. A circuit according to claim 5, wherein the means for comparing comprises means for deriving a product signal equal to the product of the second and third signals, means for opposing the first signal and the product signal at a common point means for detecting a departure from zero potential at that point.

7. A circuit according to claim 6, wherein the means for detecting departure from zero potential comprises a nulling operational amplifier having input connections at the common point potential and at zero reference potential such that the difference signal is produced at the output of the amplifier.

8. A circuit according to claim 1, wherein the circuit is adapted to be inputted with a d.c. excitation of undetermined polarity or an a.c. excitation, and the variable resistance means comprises a pair of field-effect transistors, series connected in opposition, that one of the pair which is forward conducting being operative in the variable resistance mode and the other of the pair being subject to saturation bias.

9. A circuit according to claim 8, wherein the means for comparing comprises means for rectifying and integrating the first and second signals, means for deriving from the respective integrals a value representing the voltage level and a value representing the current level, storage means for the selected resistance value and means for computing the ratio of voltage and current for comparison with the resistance value to produce the difference signal.

10. A circuit according to claim 1, wherein the circuit is adapted to simulate the characteristic of a resistance-variable sensing element, and the third signal represents a selected value of resistance at a selected point on the characteristic to be simulated.

11. An apparatus for simulating the characteristic of a resistance-variable sensing element comprising a pair of terminals for the input of an excitation current, automatically variable resistance means connected in the current path between the terminals, means for deriving a first signal representing the value of the voltage appearing across the terminals, means for deriving a second signal representing the value of the excitation current, means for generating a third signal representing the value of resistance at a selected point on the characteristic to be simulated, means for comparing the ratio of the first and second signals with the value of the third signal to derive a difference signal, and means for applying the difference signal to cause the variable resistance means to change in value such that said ratio tends towards exact equality with the selected value of resistance.

12. An apparatus according to claim 11, wherein the apparatus is adapted to be inputted with a d.c. excitation of predetermined polarity and the variable resistance means comprises a field-effect transistor.

13. An apparatus according to claim 11, wherein the apparatus is adapted to be inputted with an excitation selected from a d.c. excitation of undetermined polarity and an a.c. excitation, and the variable resistance means comprises a pair of field-effect transistors, series connected in opposition, that one of the pair which is forward conducting being operative in the variable resistance mode and the other of the pair being subject to saturation bias.

14. An apparatus according to claim 11, wherein the means for generating the third signal includes means for storing values of the sensing function and corresponding values of resistance, means for selecting a desired one of such values and means for deriving a read-out signal representing the resistance value.

15. An apparatus according to claim 14, wherein the read-out signal has a value equal to the selected resistance expressed as a fraction of the maximum resistance provided by the simulator and the third signal is obtained by multiplying the read-out signal by a further signal representing the maximum resistance value.

16. An apparatus according to claim 11, wherein the apparatus is adapted to be inputted with a d.c. of predetermined polarity and the means for comparing comprises means for deriving a product signal equal to the product of the second and third signals, means for opposing the first signal and the product signal at a common point and means for detecting a departure from zero potential at that point.

17. An apparatus according to claim 16, wherein the means for detecting a departure from zero potential comprises a nulling operational amplifier having input connections at the common point potential and at zero reference potential such that the difference signal is produced at the output of the amplifier.

18. An apparatus according to claim 11, wherein the apparatus is adapted to be inputted with an excitation current selected from a d.c. excitation of undetermined polarity or an a.c. excitation and the means for comparing comprises means for integrating the first and second signals, means for deriving from the respective integrals a value representing the voltage level and a value representing the current level, storage means for the selected resistance value and means for computing the ratio of voltage and current for comparison with the resistance value to produce the difference signal.

19. An apparatus according to claim 11, wherein the means for selecting a desired resistance value includes programming means enabling the selection of a succession of predetermined values.

20. An apparatus according to claim 19, wherein the means for selecting is arranged to select the succession of predetermined values at predetermined intervals.

* * * * *